(12) United States Patent
Carroll et al.

(10) Patent No.: US 11,682,395 B2
(45) Date of Patent: Jun. 20, 2023

(54) ELECTRONIC DEVICE, SYSTEM, METHOD AND PROGRAM FOR EXTERNALLY ADDING VOICE CONTROL FUNCTIONALITY TO ANOTHER DEVICE

(71) Applicant: ARRIS Enterprises LLC, Suwanee, GA (US)

(72) Inventors: Brian Carroll, Quakertown, PA (US); Joseph Petry, Philadelphia, PA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 198 days.

(21) Appl. No.: 17/149,989

(22) Filed: Jan. 15, 2021

(65) Prior Publication Data

US 2021/0225375 A1 Jul. 22, 2021

Related U.S. Application Data

(60) Provisional application No. 62/961,902, filed on Jan. 16, 2020.

(51) Int. Cl.
*G10L 15/22* (2006.01)

(52) U.S. Cl.
CPC .................................. *G10L 15/22* (2013.01)

(58) Field of Classification Search
CPC ... G10L 15/22; G10L 2015/223; G10L 15/26; G10L 15/30; H04N 21/42204; G06F 3/167
See application file for complete search history.

(56) References Cited

U.S. PATENT DOCUMENTS

| | | | | |
|---|---|---|---|---|
| 11,295,735 | B1* | 4/2022 | Anuar | G10L 15/30 |
| 2015/0154976 | A1* | 6/2015 | Mutagi | G06F 3/167 |
| | | | | 704/275 |
| 2016/0019781 | A1* | 1/2016 | Lee | G08C 17/02 |
| | | | | 340/12.5 |
| 2016/0191992 | A1* | 6/2016 | Kwon | H04N 21/4753 |
| | | | | 725/30 |
| 2016/0353428 | A1* | 12/2016 | Kafle | H04N 21/42203 |
| 2017/0324794 | A1* | 11/2017 | Jeong | H04N 21/44008 |
| 2018/0131891 | A1* | 5/2018 | Satheesh | H04N 21/41265 |
| 2018/0184152 | A1* | 6/2018 | Kirkpatrick | H04N 21/43637 |
| 2018/0316876 | A1* | 11/2018 | Gopinath | H04N 5/268 |
| 2019/0069058 | A1* | 2/2019 | Lemons | G06F 3/167 |
| 2019/0089925 | A1* | 3/2019 | Lee | H04N 5/642 |
| 2020/0107387 | A1* | 4/2020 | Li | H04B 17/318 |

* cited by examiner

*Primary Examiner* — Mark Villena
(74) *Attorney, Agent, or Firm* — Wenderoth, Lind & Ponack, L.L.P.

(57) ABSTRACT

An electronic device, a system, a method, and a program for externally adding voice control functionality to another device are disclosed. The electronic device includes memory, a processor, an audio input interface, a first communication interface, a second communication interface, and an audio encoder. First return audio data is received by the first communication interface from a sink device. An audio signal corresponding to a voice command is received by the audio input interface from a transducer. The audio signal is encoded by the audio encoder to obtain second return audio data. The second return audio data is output by the second communication interface to a source device. The second return audio data is encoded by an audio encoder of the source device to obtain control data. A function of the source device is controlled based on the control data.

17 Claims, 4 Drawing Sheets

ELECTRONIC DEVICE, SYSTEM, METHOD AND PROGRAM FOR EXTERNALLY ADDING VOICE CONTROL FUNCTIONALITY TO ANOTHER DEVICE

BACKGROUND

A common way of controlling devices is through voice control. Voice control generally entails receiving a verbal command from a user, processing the verbal command through speech recognition whereby the verbal command is converted into a digital format, correlating the digitized command to a predefined function, and then operating a device according to the predefined function.

One popular device that can be controlled by voice in many homes is the so-called "set-top-box" (STB), which houses electronic circuits that convert signals from an input line into signals usable by sink devices for displaying data and audio/video (A/V) media content such as television programming and movies. Other devices that can be controlled by voice include DVD players, cable terminals, Over the Top video players, Android media players, etc.

Existing solutions require integrating a voice control module in the device itself (such as an STB with a connected television) whereby all the requisite hardware is embodied in one device.

However, the decision to feature voice control must be made by the time of manufacture and voice control cannot be retroactively added. Accordingly, existing solutions require a large form factor and extensive additional hardware in the device itself, both of which must be provided for all users irrespective of individual user preferences. Furthermore, the location of an integrated voice control microphone cannot be changed and necessarily must be the same as the device to be controlled by voice. Accordingly, the fixed location of the device to be controlled by voice may impair the acoustic performance of the voice control microphone. Currently, voice control functionality cannot be subsequently added to devices originally manufactured without voice control modules. Therefore, the existing solutions cannot be retrofitted, are complex, expensive and burdensome—in particular, for users who do not desire voice control functionality.

Thus, it would be advantageous and an improvement over existing solutions to provide an electronic device, a system, a method, and a program that externally add voice control functionality to another device and can be easily relocated.

SUMMARY

An electronic device, a system, a method and a program for externally adding voice control functionality to another device (such as an STB with a connected television) are disclosed in the present application.

The electronic device comprises:
memory;
a processor;
an audio input interface;
a first communication interface;
a second communication interface; and
an audio encoder,
wherein the processor is configured to:
receive, by the first communication interface, first return audio data from a sink device;
receive, by the audio input interface, an audio signal corresponding to a voice command from a transducer;
encode, by the audio encoder, the audio signal to obtain second return audio data; and
output, by the second communication interface, the second return audio data to a source device as an instruction to control a function of the source device,
wherein the electronic device is a stand-alone device that is external to the source device and the sink device.

The method comprises:
receiving, by a first communication interface of an electronic device, first return audio data from a sink device;
receiving, by an audio input interface of the electronic device, an audio signal corresponding to a voice command from a transducer;
encoding, by an audio encoder of the electronic device, the audio signal to obtain second return audio data; and
outputting, to the source device by a second communication interface of the electronic device, the second return audio data as an instruction to control a function of the source device,
wherein the electronic device is a stand-alone device that is external to the source device and the sink device.

In an embodiment described in the present application, a non-transitory computer-readable recording medium has recorded thereon a program embodying the features of the method discussed above.

A system may include the electronic device and at least one of the source device, the sink device, and the transducer.

The electronic device may use industry standard connections and does not require structural modification to the source device. Accordingly, the electronic device is backward compatible with source devices that are already deployed and voice functionality can be simply added to these source devices with a software upgrade.

DETAILED DESCRIPTION

Exemplary embodiments will be described in detail below with reference to the drawings. The description and drawings are provided so that a person skilled in the art can fully understand the present disclosure and are not intended to limit the subject matter recited in the claims.

The electronic device, the system, the method, and the program disclosed herein address and solve the following problems:

How to limit the cost of adding voice control to individual devices for only the subset of users who desire voice control.

How to separate a voice control microphone from a device to be controlled by voice so as to optimize the location of the voice control microphone so as to provide the best acoustic performance and optimal position for a specific environment.

How to retroactively add voice control functionality to a device that has already been manufactured and/or is in use.

How to leverage the solution to the above-mentioned problems using industry standard connections and without requiring structural modification to the device to be controlled by voice.

The electronic device, the system, the method, and the program disclosed herein solve the problems identified above and provide an efficient and cost effective solution to externally add voice control functionality to another device.

Figure 1:
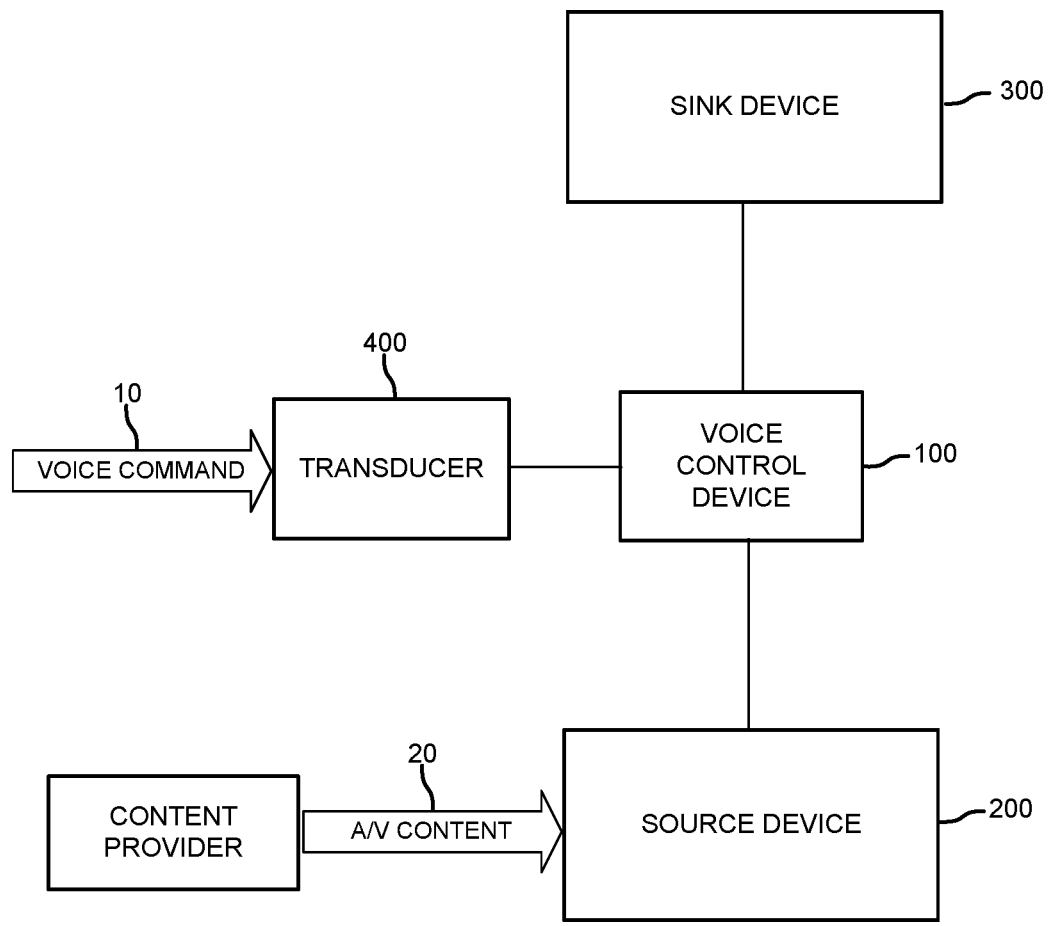
FIG. 1 is a system diagram including a voice control device 100, a source device 200, a sink device 300, and a transducer 400.
Figure 1:
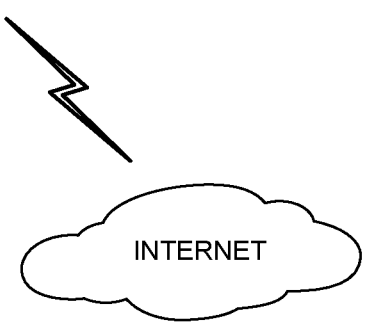
Figure 2:
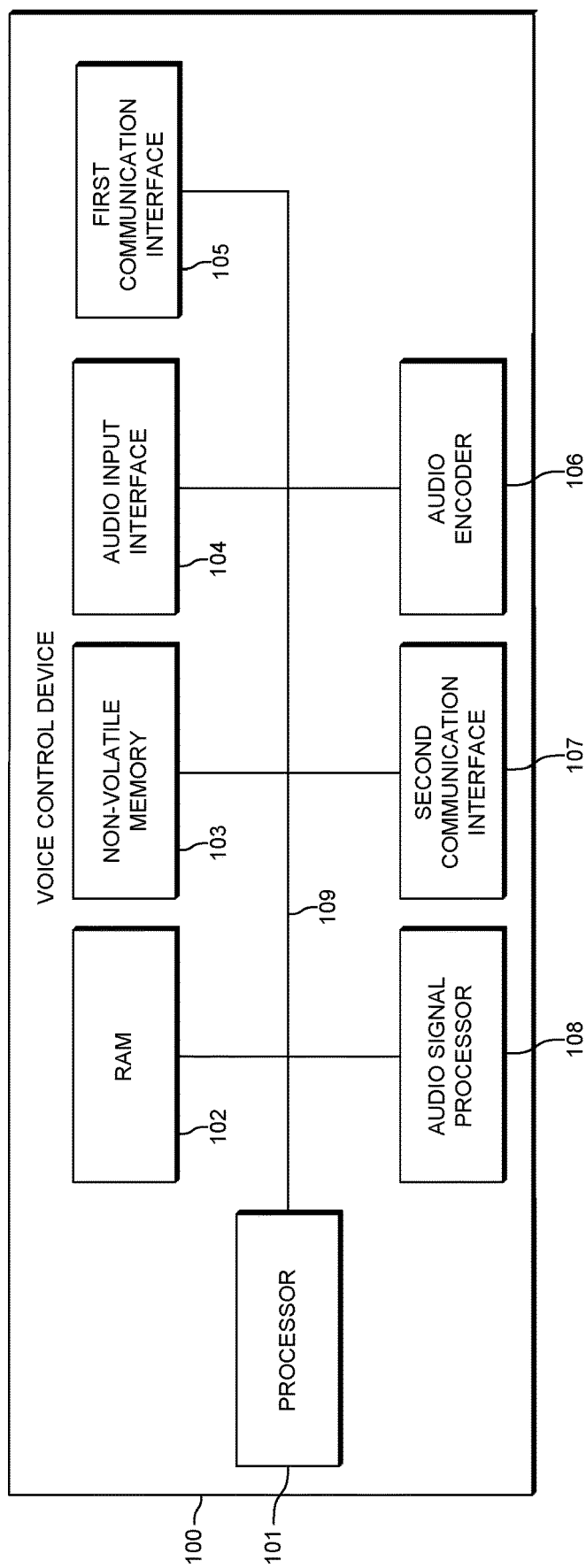
FIG. 2 is a block diagram of the voice control device 100.

FIG. 1 is a system diagram including a voice control device 100, a source device 200, a sink device 300, and a transducer 400. The voice control device 100 is a stand-alone device that is external to the source device 200 and the sink device 300 and includes components and circuits (e.g., as shown in FIG. 2) that encode an audio signal corresponding to a voice command 10 received from the transducer 400 as audio data (e.g., second return audio data) and output the audio data to the source device 200. The operation of the components and circuits of the voice control device 100 will be discussed in more detail with reference to FIG. 2.

Figure 3:
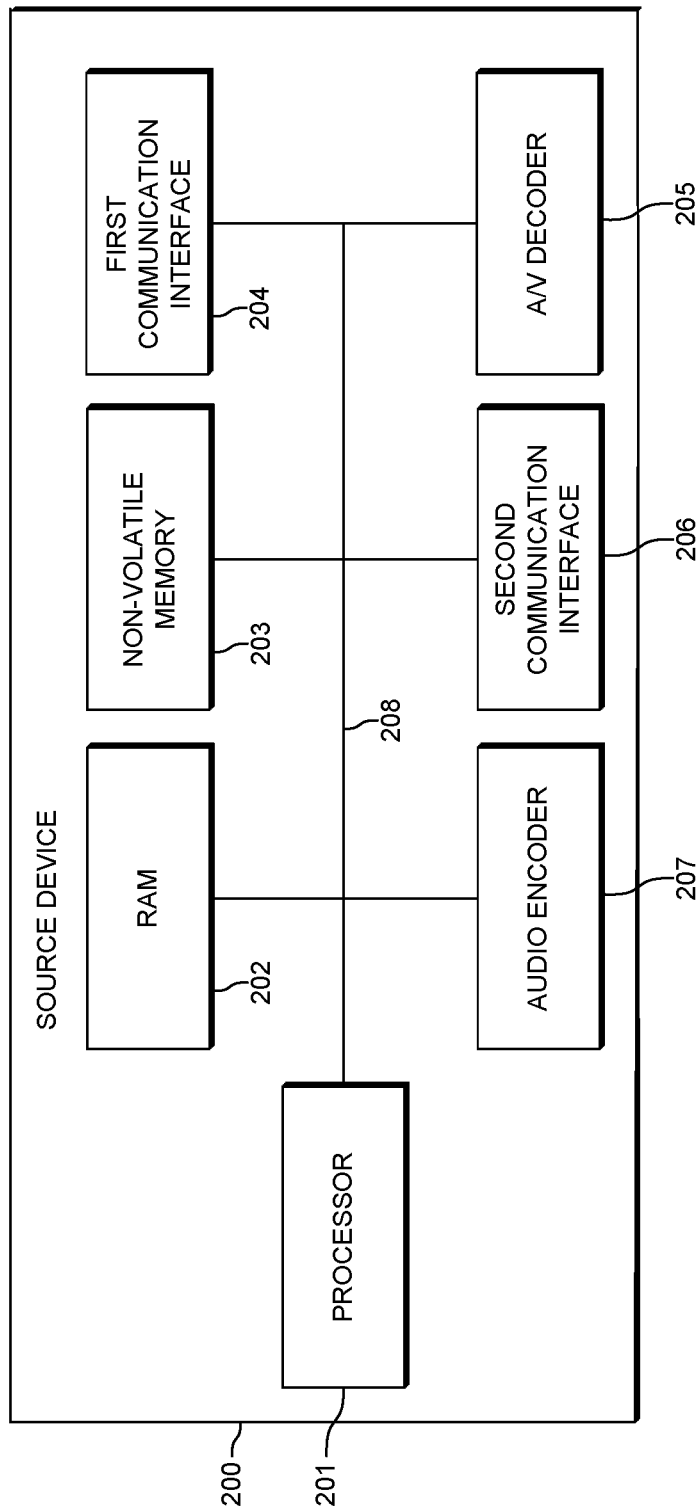
FIG. 3 is a block diagram of the source device 200.

For ease of discussion, the source device 200 may be a stand-alone STB, but the present disclosure is not intended to be limited only to this type of STB and alternatively the source device 200 can be integrated directly into a consumer device such as a television, a computer, or any other consumer device, such as an electronically equipped appliance. The source device 200 includes components and circuits (e.g., as shown in FIG. 3) that convert A/V content 20 from a service provider into A/V data that is usable by the sink device 300. For example, the A/V content 20 to the source device 200 may be provided by service providers including cable television providers, satellite television providers, internet service providers, and multiple system operators (MSOs); and the A/V content 20 may include, but is not limited to, television programming and movies. The operation of the components and circuits of the source device 200 will be discussed in more detail with reference to FIG. 3.

The sink device 300 may include, but is not limited to, a television, a computer, a portable device, an electronic tablet, a smart phone and or any other consumer device capable of executing and displaying A/V data received from the source device 200. The sink device 300 may include a communication interface for transferring video data and digital audio data. The communication interface may include, for example, a digital media interface (DMI), a high-definition multimedia audio return channel interface (HDMI-ARC) or another A/V interface for transferring video data and digital audio data from an HDMI-compliant source device over a cable. HDMI-ARC, for example, enables bidirectional flow of audio data between a sink device and a peripheral or intermediate device between the sink device and a source device. The sink device 300 may include any other element such as a Bluetooth transceiver, a user interface, a tuner, a Wi-Fi transceiver, an Infrared (IR) receiver, and/or a speaker.

For ease of discussion, the transducer 400 may be a stand-alone microphone, but the present disclosure is not intended to be limited only to this type of microphone and alternatively the transducer 400 can be integrated directly into the voice control device 100. The transducer 400 can convert a sound (e.g., a voice command) into a corresponding audio signal (e.g., an electrical audio signal). The transducer 400 may be a single transducer or an array of transducers. In the embodiments shown, the transducer 400 is a stand-alone device that is external to the voice control device 100. In other variations, the transducer 400 may be integrated into the voice control device 100. In any case, unlike existing solutions, the transducer 400 can be moved to different locations according to individual user preferences or so as to optimize acoustic performance of the transducer 400.

FIG. 2 is a block diagram of the voice control device 100. The voice control device 100 may include a processor 101, RAM 102, non-volatile memory 103, an audio input interface 104, a first communication interface 105, an audio encoder 106, a second communication interface 107, an audio signal processor 108, and a communication bus 109 through which various components in the voice control device 100 are connected for communicating data there between.

The processor 101 may be a dedicated controller, CPU, microprocessor, etc., capable of controlling the operation of the components and circuits of the voice control device 100. The RAM 102 may be implemented as a working memory for the processor 101, and the non-volatile memory 103 can be provided for storage of program code, audio data, keyword data, and other information. The audio input interface 104 may receive an audio signal from the transducer 400 and the audio encoder 106 may encode the audio signal received from the transducer 400 to obtain audio data (e.g., second return audio data) that is usable by the source device 200. The audio data obtained by the audio encoder 106 is output to the source device 200 via the second communication interface 107. The audio encoder 106 may be a dual or multichannel audio return channel (ARC) formatter.

The voice control device 100 receives audio data (e.g., first return audio data) from the sink device 300 via the first communication interface 105. In some embodiments, the voice control device 100 may further include an audio signal processor 108. The audio signal processor 108 may perform enhancement such as digital signal processing, echo cancellation of external sources, and/or beamforming. The audio signal may also be processed using any parameters or algorithms to enhance the ability to receive and decipher the audio signal. The parameters or algorithms may be included in the audio data received from the sink device 300. In some variations, the audio signal processor 108 may be omitted.

Each of the first communication interface 105 and the second communication interface 107 may include, for example, a DMI, an HDMI-ARC or another A/V interface for transferring video data and digital audio data from an HDMI-compliant source device over a cable.

The voice control device 100 may include any other element such as a Bluetooth transceiver, a user interface, a tuner, a Wi-Fi transceiver, an IR receiver and/or a speaker.

FIG. 3 is a block diagram of the source device 200. The source device 200 may include a processor 201, RAM 202, non-volatile memory 203, a first communication interface 204, an A/V decoder 205, a second communication interface 206, an audio encoder 207, and a communication bus 208 through which various components in the source device 200 are connected for communicating data there between. The processor 201 may be a dedicated controller, CPU, microprocessor, etc., capable of controlling the operation of the components and circuits of the source device 200. The RAM 202 may be implemented as a working memory for the processor 201, and the non-volatile memory 203 can be provided for storage of program code, audio data, keyword data, and other information. The second communication interface 206 may include, for example, a DMI, an HDMI-ARC or another A/V interface for transferring video data and digital audio data from an HDMI-compliant source device over a cable.

The source device 200 may include any other element such as a Bluetooth transceiver, a user interface, a tuner, a Wi-Fi transceiver, an IR receiver, and/or a speaker.

The source device 200 receives audio data (e.g., second return audio data) from the voice control device 100 via the second communication interface 206. The audio encoder 207 may encode the audio data received from the voice control device 100 to obtain control data for controlling a function of the source device 200. The encoding of the audio data received from the voice control device 100 can either be performed internally on the source device 200 by the audio encoder 207, or remotely from the source device 200. For example, the source device 200 may also be connected to the Internet such that the audio data received from the voice control device 100 can be sent to the cloud for processing to obtain the control data and returned to the source device 200. The encoding of the audio data received from the voice control device 100 can include, but is not limited to, any speech recognition techniques, voice recognition techniques, machine learning, audio indexing, audio sampling, audio classification, keyword detection, correction, acoustic modelling, clustering, etc. Individual users could have individual profiles or identifications whereby the processing of the audio data received from the voice control device 100 includes voice recognition to determine which user is making the voice command to the transducer 400 and either allowing, disallowing, or restricting voice control based on the determination.

The function of the source device to be controlled may include, but is not limited to, one or more of powering up the source device, powering down the source device, tuning the source device to a particular channel, switching an input or output of the source device, launching applications of the source device, selecting options of the source device, or any other function known in the art. In some variations, the encoding could include keyword detection. For example, a user could speak the phrase "on" or "wake up" and the voice control device could use HDMI-CEC (Consumer Electronics Control) to notify or power up the source device.

A/V content 20 is received by the first communication interface 204 of the source device 200 and decoded by A/V decoder 205 to obtain A/V data, and the A/V data is provided to the second communication interface 107 of the voice control device 100 via the second communication interface 206 of the source device 200. The connection between the second communication interface 206 of the source device 200 and the second communication interface 107 of the voice control device 100 can be a wired connection.

The A/V data obtained by decoding the A/V content 20 received by the source device 200 is also provided to the sink device 300 via the voice control device 100. The A/V data is output by the first communication interface 105 of voice control device 100 to the communication interface of the sink device 300. The connection between the first communication interface 105 of the voice control device 100 and the communication interface of the sink device 300 can be a wired connection.

The first communication interface 204 includes one or more connectors, such as RF connectors or Ethernet connectors. One of the connectors of the first communication interface 204 can be connected to a content provider, such as an MSO, by terrestrial antenna, satellite dish, or wired cable. Through this connector of first communication interface 204, the source device 200 receives the A/V content 20 from the content provider. Additionally, one of the connectors of the first communication interface 204 can be used to send data to the content provider.

In some embodiments, each of the communication interface of the sink device 300, the first communication interface 105, the second communication interface 107, and the second communication interface 206 is an HDMI-ARC communication interface. Accordingly, A/V data is transferred from the source device 200 through the voice control device 100 to the sink device 300 via HDMI, audio data is returned from the sink device 300 to the voice control device 100 via ARC, and audio data is returned from the voice control device 100 to the source device 200 via ARC. Thus, industry standard connections are used and no structural modification to the source device 200 is required.

The embodiments shown are directed to control of the source device by the voice control device—however, the sink device or another device could also or alternatively be controlled by the voice control device.

Figure 4:
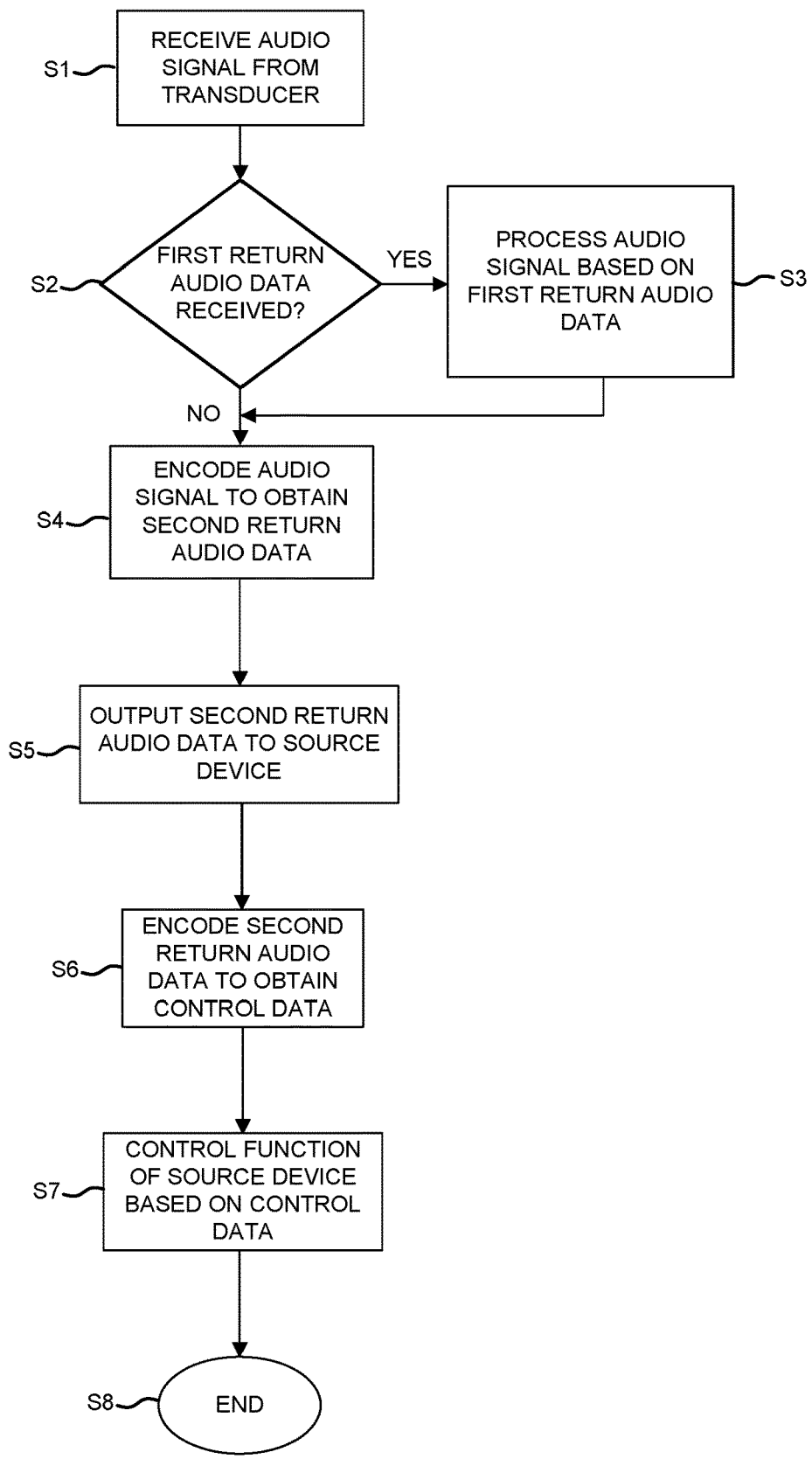
FIG. 4 is a sequence diagram illustrating exemplary operations of the voice control device 100 and the source device 200.

FIG. 4 is a sequence diagram illustrating exemplary operations of the voice control device 100 and the source device 200.

In Step S1, an audio signal corresponding to a voice command is received by the voice control device 100 from a transducer 400.

In Step S2, it is determined whether first return audio data including signal processing data has been received by the first communication interface 105. If first return audio data including signal processing data has been received by the first communication interface 105, then the audio signal is processed by the audio signal processor 108 based on the signal processing data in the first return audio data in Step S3. If first return audio data including signal processing data has not been received by the first communication interface 105, then Step S3 is omitted and Step S4 is performed.

In Step S4, the audio signal is encoded by the audio encoder 106 to obtain second return audio data.

In Step S5, the second return audio data is output by the second communication interface 107 to the source device 200.

In Step S6, the second return audio data is encoded to obtain control data.

In Step S7, a function of the source device 200 is controlled based on the control data.

In Step S8, the method ends.

As noted above, the present invention can be implemented not only as a device or a system, but also as a method for externally adding voice control functionality to another device. The present invention can be implemented as a program on a non-transitory computer-readable medium for causing a computer, such as the processor in an electronic device or the processor in an STB, to execute the steps described in FIG. 4. The non-transitory computer-readable recording medium could be, for example, a CD-ROM, DVD, Blu-ray disc, or an electronic memory device.

The present invention may be implemented as any combination of a system, a method, an integrated circuit, and a computer program on a non-transitory computer readable recording medium. The processor and any other parts of the electronic devices may be implemented as Integrated Circuits (IC), Application-Specific Integrated Circuits (ASIC), or Large Scale Integrated circuits (LSI), system LSI, super LSI, or ultra LSI components which perform a part or all of the functions of the electronic devices, such as STBs.

Each of the parts of the present invention can be implemented using many single-function components, or can be one component integrated using the technologies described above. The circuits may also be implemented as a specifically programmed general purpose processor, CPU, a specialized microprocessor such as a Digital Signal Processor that can be directed by program instructions on a memory, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present invention may be a non-transitory computer-readable recording medium having recorded thereon a program embodying the methods/algorithms discussed above for instructing the processor to perform the methods/algorithms. Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory.

The sequence of the steps included in the above described algorithms is exemplary, and algorithms having a sequence other than the above described sequences are contemplated. Moreover, steps, or parts of the algorithm, may be implemented simultaneously or in parallel.

The source device of the present invention can be in the form of an STB as in the exemplary embodiments disclosed above, or in other stand-alone devices, or may be incorporated in a television or other content playing device, or other device or appliance, and the scope of the present invention is not intended to be limited to such forms.

It is also contemplated that the implementation of the components of the present invention can be done with any newly arising technology that may replace any of the above implementation technologies.

We claim:

1. An electronic device for externally adding voice control functionality to a source device, the electronic device comprising:
   memory;
   a processor;
   an audio input interface;
   a first communication interface;
   a second communication interface; and
   an audio encoder,
   wherein the processor is configured to:
   receive, by the first communication interface, first return audio data from a sink device;
   receive, by the audio input interface, an audio signal corresponding to a voice command from a transducer;
   encode, by the audio encoder, the audio signal to obtain second return audio data; and
   output, by the second communication interface, the second return audio data to the source device as an instruction to control a function of the source device, and
   wherein:
   the electronic device is a stand-alone device that is external to at least the source device and the sink device;
   the first communication interface is an HDMI-ARC interface;
   the second communication interface is an HDMI-ARC interface; and
   the processor is configured to encode, by the audio encoder, the audio signal to obtain the second return audio data in an HDMI-ARC format.

2. The electronic device of claim 1, further comprising an audio signal processor, wherein the processor is further configured to process, by the audio signal processor, the audio signal based on the first return audio data.

3. The electronic device of claim 1, wherein the audio signal corresponds to a command to power up the source device.

4. The electronic device of claim 1, wherein the processor is further configured to:
   receive, by the second communication interface, A/V data from the source device; and
   output, by the first communication interface, the A/V data to the sink device.

5. A system comprising the electronic device of claim 1 and the source device.

6. The system of claim 5, further comprising at least one of the sink device and the transducer.

7. The system of claim 5, wherein:
   the source device comprises memory, a processor, a communication interface, and an audio encoder;
   the processor of the source device is configured to:
   receive, by the communication interface of the source device, the second return audio data from the electronic device;
   encode, by the audio encoder of the source device, the second return audio data received from the electronic device to obtain control data; and
   control the function of the source device based on the control data.

8. A method implemented on an electronic device for externally adding voice control functionality to a source device, the method comprising:
   receiving, by a first communication interface of the electronic device, first return audio data from a sink device;
   receiving, by an audio input interface of the electronic device, an audio signal corresponding to a voice command from a transducer;
   encoding, by an audio encoder of the electronic device, the audio signal to obtain second return audio data; and
   outputting, to the source device by a second communication interface of the electronic device, the second return audio data as an instruction to control a function of the source device,
   wherein:
   the electronic device is a stand-alone device that is external to at least the source device and the sink device;
   the first communication interface of the electronic device is an HDMI-ARC interface;
   the second communication interface of the electronic device is an HDMI-ARC interface; and
   the encoding, by the audio encoder of the electronic device, the audio signal to obtain the second return audio data includes encoding the audio signal in an HDMI-ARC format.

9. The method of claim 8, further comprising processing, by an audio signal processor of the electronic device, the audio signal based on the first return audio data.

10. The method of claim 8, further comprising powering up the source device based on the audio signal.

11. The method of claim 8, further comprising:
    receiving, by the second communication interface of the electronic device, A/V data from the source device; and
    outputting, by the first communication interface of the electronic device, the A/V data to the sink device.

12. The method of claim 8, further comprising:
    receiving, by a communication interface of the source device, the second return audio data from the electronic device;

encoding, by an audio encoder of the source device, the second return audio data from the electronic device to obtain control data; and controlling, by a processor of the source device, the function of the source device based on the control data.

13. A non-transitory computer readable storage medium having stored thereon a program implemented on an electronic device for externally adding voice control functionality to a source device, the program causing the electronic device to perform steps comprising:

receiving, by a first communication interface of the electronic device, first return audio data from a sink device;

receiving, by an audio input interface of the electronic device, an audio signal corresponding to a voice command from a transducer;

encoding, by an audio encoder of the electronic device, the audio signal to obtain second return audio data; and outputting, to the source device by a second communication interface of the electronic device, the second return audio data as an instruction to control a function of the source device, wherein:

the electronic device is a stand-alone device that is external to at least the source device and the sink device;

the first communication interface of the electronic device is an HDMI-ARC interface;

the second communication interface of the electronic device is an HDMI-ARC interface; and the encoding, by the audio encoder of the electronic device, the audio signal to obtain the second return audio data audio includes encoding the audio signal in an HDMI-ARC format.

14. The non-transitory computer readable storage medium according to claim 13, wherein the program causes the electronic device to perform steps further comprising processing, by an audio signal processor of the electronic device, the audio signal based on the first return audio data.

15. The non-transitory computer readable storage medium according to claim 13, wherein the program causes the electronic device to perform steps further comprising powering up the source device based on the audio signal.

16. The non-transitory computer readable storage medium according to claim 13, wherein the program causes the electronic device to perform steps further comprising:

receiving, by the second communication interface of the electronic device, A/V data from the source device; and outputting, by the first communication interface of the electronic device, the A/V data to the sink device.

17. The non-transitory computer readable storage medium according to claim 13, wherein the program causes the electronic device to perform steps further comprising:

receiving, by a communication interface of the source device, the second return audio data from the electronic device;

encoding, by an audio encoder of the source device, the second return audio data from the electronic device to obtain control data; and controlling, by a processor of the source device, the function of the source device based on the control data.

* * * * *